United States Patent
Wang et al.

(10) Patent No.: US 10,777,791 B1
(45) Date of Patent: Sep. 15, 2020

(54) BATTERY, BATTERY MODULE, BATTERY PACK AND ELECTRIC VEHICLE

(71) Applicant: BYD COMPANY LIMITED, Shenzhen, Guangdong (CN)

(72) Inventors: Chuanfu Wang, Shenzhen (CN); Long He, Shenzhen (CN); Huajun Sun, Shenzhen (CN); Jianhua Zhu, Shenzhen (CN); Zhipei Lu, Shenzhen (CN); Yan Zhu, Shenzhen (CN); Shichao Hu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/707,837

(22) Filed: Dec. 9, 2019

(30) Foreign Application Priority Data

Oct. 23, 2019 (CN) .......................... 2019 1 1012284

(51) Int. Cl.
*H01M 2/10* (2006.01)
*H01M 2/36* (2006.01)
*B60L 50/64* (2019.01)

(52) U.S. Cl.
CPC .......... *H01M 2/1077* (2013.01); *B60L 50/64* (2019.02); *H01M 2/362* (2013.01); *H01M 2220/20* (2013.01)

(58) Field of Classification Search
None
See application file for complete search history.

(56) References Cited

U.S. PATENT DOCUMENTS

2017/0040575 A1   2/2017   Bang

FOREIGN PATENT DOCUMENTS

| CN | 101202355 A | 6/2008 |
|---|---|---|
| CN | 201084772 Y | 7/2008 |
| CN | 101719562 A | 6/2010 |
| CN | 102104167 A | 6/2011 |
| CN | 202797173 U | 3/2013 |
| CN | 203150621 U | 8/2013 |
| CN | 104282864 A | 1/2015 |
| CN | 206271794 U | 6/2017 |

(Continued)

OTHER PUBLICATIONS

Search Report from Chinese Application No. 2019110117137 dated Oct. 23, 2019.

(Continued)

*Primary Examiner* — Sarah A. Slifka
(74) *Attorney, Agent, or Firm* — Calfee, Halter & Griswold LLP

(57) ABSTRACT

A battery includes a case and a battery core assembly disposed in the case, the battery core assembly includes a plurality of battery core groups and an receiving space holding the plurality of battery core groups, the battery core groups are connected in series, and the battery core group includes at least one battery core; a separator plate is disposed between at least two adjacent battery core groups, the separator plate divides the receiving space into a plurality of receiving cavities, each of the receiving cavities holds one or more battery core groups, and a cavity wall of the receiving cavity comprised by a connection of the separator plate and a separation membrane; and the battery further includes a liquid injection channel and the liquid injection channel in a sealed state, the liquid injection channel is disposed on at least one of the separation membranes and the separator plates.

20 Claims, 8 Drawing Sheets

(56) References Cited

FOREIGN PATENT DOCUMENTS

| CN | 107230801 A | 10/2017 |
|---|---|---|
| CN | 207368044 U | 5/2018 |
| EP | 1705731 A1 | 9/2006 |
| EP | 2393146 A1 | 12/2011 |
| JP | 2000021438 A | 1/2000 |
| JP | 2007172943 A | 7/2007 |
| WO | 2005119812 A1 | 12/2005 |

OTHER PUBLICATIONS

Search Report from Chinese Application No. 2019110122845 dated Oct. 23, 2019.
Notification of Grant Patent Right for Invention from 2019110117137 dated Jan. 10, 2020.
Notification of Grant Patent Right for Invention from 2019110122845 dated Jan. 6, 2020.
Office Action from Chinese Application 2019110117137 dated Dec. 10, 2019 with English Translation.
Office Action from Chinese Application 2019110122845 dated Dec. 10, 2019 with English Translation.
Search Report for European Patent Application No. 19214393.1 dated Jun. 17, 2020.
Search Report for European Patent Application No. 19214392.3 dated Jun. 12, 2020.

BATTERY, BATTERY MODULE, BATTERY PACK AND ELECTRIC VEHICLE

CROSS REFERENCE TO RELATED APPLICATION

The present application claims the priority of Chinese Patent Application No. 201911012284.5, filed on Oct. 23, 2019, the entire content of which is herein incorporated by reference.

FIELD

The present disclosure relates to the battery field, and in particular, to a battery, a battery module, a battery pack, and an electric vehicle.

BACKGROUND

With the increasing popularity of new energy vehicles, the use of power batteries in new energy vehicles is becoming more and more demanding. Especially, a requirement of a user for endurance mileage of the new energy vehicle continuously increases. The total capacity of a battery pack used by the new energy vehicle needs to be continuously improved. In addition, in a use process of the power battery pack, internal consumption and heating caused by an internal resistance are required to be minimized.

Generally, only one nude battery core or a plurality of nude battery cores connected in parallel is disposed in a case of the battery, and a single nude battery core or a plurality of nude battery cores connected in parallel cannot improve the voltage of the whole battery. For example, a voltage of a lithium titanate battery is 2.4V; a voltage of a lithium iron phosphate battery is 3.2V; a voltage of a ternary battery is 3.7V; and a voltage of a multi-polymer battery is 4.3V. Therefore, when a high voltage (a high capacity) is required, a large quantity of batteries is connected in series to form a battery group, and then battery groups are assembled into a power battery pack. Two adjacent battery need to be connected through a connector to perform a power connection. Consequently, there are many battery installation structures, which not only increase costs but also increase an entire weight. In addition, the installation structures occupy relatively large internal space of the pack, leading to a reduction in an overall capacity of the power battery pack. The more batteries are disposed side by side, the more space is wasted. In addition, because a plurality of peripheral power connector needs to be disposed to form a power connection, the internal resistance is increased, thus increasing internal consumption and heating of the power battery pack during use.

SUMMARY

The content of this application is intended to at least resolve one of the technical problems existing in the patent above. Therefore, according to a first aspect of this application, a battery is provided, including: a case and a battery core assembly disposed in the case.

The battery core assembly includes a plurality of battery core groups and an receiving space holding the plurality of battery core groups, the battery core groups are connected in series, and the battery core groups each include at least one battery core; a separator plate is disposed between at least two adjacent battery core groups, the separator plate divides the receiving space into a plurality of receiving cavities, each of the receiving cavities holds one or more battery core groups, in some embodiments, each of the receiving cavities holds a single battery core group, and a cavity wall of the receiving cavity comprised by a connection of the separator plate and a separation membrane; and the battery further includes a liquid injection channel in a sealed state, and the liquid injection channel is disposed on at least one of the separation membranes and separator plates.

In some embodiments of the present disclosure, before the battery core assembly is located in the case, at least one of the liquid injection channel is in an open state, and the electrolyte is injected into at least one of the receiving cavities through the liquid injection channel on the receiving cavity.

In some embodiments of the present disclosure, a sealing portion is disposed in the liquid injection channel, and the sealing portion seals the liquid injection channel.

In some embodiments of the present disclosure, the battery core assembly includes a plurality of battery core groups, the separator plate is disposed between two adjacent battery core groups, and each of the receiving cavities holds one battery core group.

In some embodiments of the present disclosure, the separation membrane is located between the battery core groups and the case, and the separation membrane is connected to the separator plate in a sealed manner to form a sealed receiving cavity.

In some embodiments of the present disclosure, the sealed receiving cavity is defined by a tubular separation membrane with openings on two ends and separator plates sealed at the openings.

In some embodiments of the present disclosure, the battery core assembly includes a separation membrane bag, the separator plates and battery core groups located in the separation membrane bag, the separator plates are connected to the separation membrane bag in a sealed manner to divide the separation membrane bag into the plurality of receiving cavities; and the battery core group is disposed in each of the receiving cavities.

In some embodiments of the present disclosure, the liquid injection channel is disposed on the separator plate, and the liquid injection channel is configured to inject an electrolyte into the receiving cavity.

In some embodiments of the present disclosure, the separator plate is located between two adjacent battery core groups, and the liquid injection channel is configured to inject an electrolyte into at least one of the two battery core groups on two sides of the separator plate.

In some embodiments of the present disclosure, the separator plate includes side surfaces facing the receiving cavity and a circumferential surface facing the case; and the liquid injection channel includes a liquid inlet and a liquid outlet connected with each other, the liquid inlet of the liquid injection channel is located on the circumferential surface of the separator plate, and the liquid outlet of the liquid injection channel is located on the side surface of the separator plate.

In some embodiments of the present disclosure, one liquid inlet is disposed on the circumferential surface of the separator plate, and the liquid outlet is disposed on one of the two side surfaces of the separator plate.

In some embodiments of the present disclosure, one liquid inlet is disposed on the circumferential surface of the separator plate, and the liquid outlet is disposed on each of the two side surfaces of the separator plate.

In some embodiments of the present disclosure, the liquid injection channel includes a first channel and a second channel, the first channel penetrates the separator plate through the side surfaces of the separator plate, the second channel extends towards the first channel from the circumferential surface of the separator plate and connected to the first channel, and a sealing portion is disposed in the second channel.

In some embodiments of the present disclosure, the second channel includes an outer segment, a closed region, and an inner segment, the closed region is located between the outer segment and the inner segment, and the first channel is connected to the second channel through the closed region; and the sealing portion includes a first segment located in the inner segment, a second segment located in the outer segment, and a third segment located in the closed region, and the third segment seals the first channel to seal the liquid injection channel.

In some embodiments of the present disclosure, the first channel and the second channel are disposed in an intersecting manner, the first channel is split into a first through hole and a second through hole by the second channel, and the first through hole and the second through hole are both connected to the closed region of the second channel.

In some embodiments of the present disclosure, the sealing portion is connected to the second channel by means of an interference fit.

In some embodiments of the present disclosure, a first liquid inlet and a second liquid inlet are disposed on the circumferential surface of the separator plate, and the liquid outlet is disposed on each of the two side surfaces of the separator plate, the liquid outlet on one of the two side surfaces of the separator plate is denoted as a first liquid outlet, and the liquid outlet on the other side surface is denoted as a second liquid outlet; and the first liquid inlet is connected with the first liquid outlet, and the second liquid inlet is connected with the second liquid outlet.

In some embodiments of the present disclosure, the separation membrane includes a separation membrane body and a protrusion portion that protrudes outward from the separation membrane body, the liquid injection channel is an opening provided on the protrusion portion, and the opening is sealed by means of hot melting.

In some embodiments of the present disclosure, each of the battery core groups includes a first electrode lead-out member and a second electrode lead-out member that are used for leading out a current, and the first electrode lead-out member and the second electrode lead-out member of at least one battery core group are disposed on two opposite sides of the battery core group along a first direction; and the first direction is an arrangement direction of the battery core group.

In some embodiments of the present disclosure, a length direction of the battery core group extends along the first direction.

In some embodiments of the present disclosure, the battery is cuboid in general, the battery has a length L, a width H, and a thickness D, the length L is greater than the width H of the battery, and the width H is greater than the thickness D of the battery, where the length L of the battery is 400 mm to 2500 mm. In some embodiments, a length direction of the battery extends along the first direction.

In some embodiments of the present disclosure, the thickness of the battery is greater than 10 mm.

In some embodiments of the present disclosure, the length L and the width H of the battery meets L/H=4~21.

In some embodiments of the present disclosure, a connection through hole is provided on the separator plate, the first electrode lead-out member of one of the two adjacent battery core groups is electrically connected to the second electrode lead-out member of the other battery core group, and a connecting portion of the first electrode lead-out member and the second electrode lead-out member is located in the connection through hole on the separator plate between the two battery core groups.

In some embodiments of the present disclosure, a sealing structure is disposed in the connection through hole, the sealing structure is configured to package the connecting portion in the connection through hole, and the sealing structure seals the connection through hole to cut off mutual circulation of the electrolyte in the two adjacent battery core groups on two sides of the separator plate.

In some embodiments of the present disclosure, the battery core assembly includes a battery core connector, and the first electrode lead-out member of one of the two adjacent battery core groups is electrically connected to the second electrode lead-out member of the other battery core group through the battery core connector.

In some embodiments of the present disclosure, a connection through hole is provided on the separator plate, the battery core connector penetrates the connection through hole, a sealing structure is disposed in the connection through hole, the sealing structure is configured to package the battery core connector in the connection through hole, and the sealing structure seals the connection through hole to cut off mutual movement of the electrolyte in the two adjacent battery core groups on two sides of the separator plate.

In some embodiments of the present disclosure, the battery core connector and the separator plate are integrally formed.

In some embodiments of the present disclosure, the battery core connector includes a copper connecting portion and an aluminum connecting portion, and a location of an electrical connection between the copper connecting portion and the aluminum connecting portion is inside the separator plate.

In some embodiments of the present disclosure, the separator plate is an insulation separator plate.

In some embodiments of the present disclosure, the battery core assembly further includes a detection unit, and the detection unit is electrically connected to the battery core group and detects a state of the battery core group.

In some embodiments of the present disclosure, the case is a metal case.

In some embodiments of the present disclosure, the battery is a lithium-ion battery.

According to a second aspect of this application, a battery module is provided, including a battery according to any one of the foregoing embodiments.

According to a third aspect of this application, a battery pack is provided, including a battery according to any one of the foregoing embodiments or the foregoing battery module.

According to a fourth aspect of this application, an electric vehicle is provided, including the foregoing battery pack.

Compared with the prior art, this application has the following advantageous effects: first, a plurality of battery core assemblies are connected in series in the case of the battery, so that the capacity of the battery can be improved; secondly, the battery core groups are located in the receiving cavities, the liquid injection channels are respectively disposed on the cavity walls of the plurality of receiving cavities. In this way, the electrolyte can be injected, through an independent channel, into each receiving cavity that holds the battery core group, to implement a shortest liquid injection path. The electrolyte can flow into the corresponding receiving cavity in time through the liquid injection channel, to ensure that the electrolyte can soak the battery core group in time and effectively. With the disposition of a plurality of liquid injection channels, the content of the electrolyte in each receiving cavity can be controlled accurately, to ensure the consistency of the electrolyte in the plurality of receiving cavities. Moreover, the liquid injection channel is in a sealed state, to prevent the liquid injection channel from connecting the two adjacent battery core receiving cavities; that is, after the liquid injection is completed, the liquid injection channel is in a sealed state, to isolate the two adjacent battery core receiving cavities. In this case, the electrolyte will not flow between the adjacent battery core receiving cavities and will not affect each other, and the electrolyte will not be decomposed due to a large potential difference, thereby ensuring the safety and service life of the battery. At last, the liquid injection hole of the battery is disposed on the receiving cavity in this application, and a case is sleeved outside the receiving cavity so that the liquid injection hole is provided inside the case. In this case, not too many openings are designed on the surface of the case, and the integrity of the battery is relatively good. The case achieves a double sealing effect for the liquid injection hole. If the electrolyte in one internal receiving cavity leaks, other receiving cavities are still maintained intact. In this case, an internal short circuit may not be caused by the conduction of the electrolyte. The sealing performance and safety performance of the entire battery are significantly improved, the service life of the battery is improved, and the manufacturing technique of the case is also simplified.

Additional aspects and advantages of this application will be partially given in the following descriptions, and other parts will become apparent in the following description or may be learned from the practice of this application.

LIST OF REFERENCE NUMERALS

Figure 1:
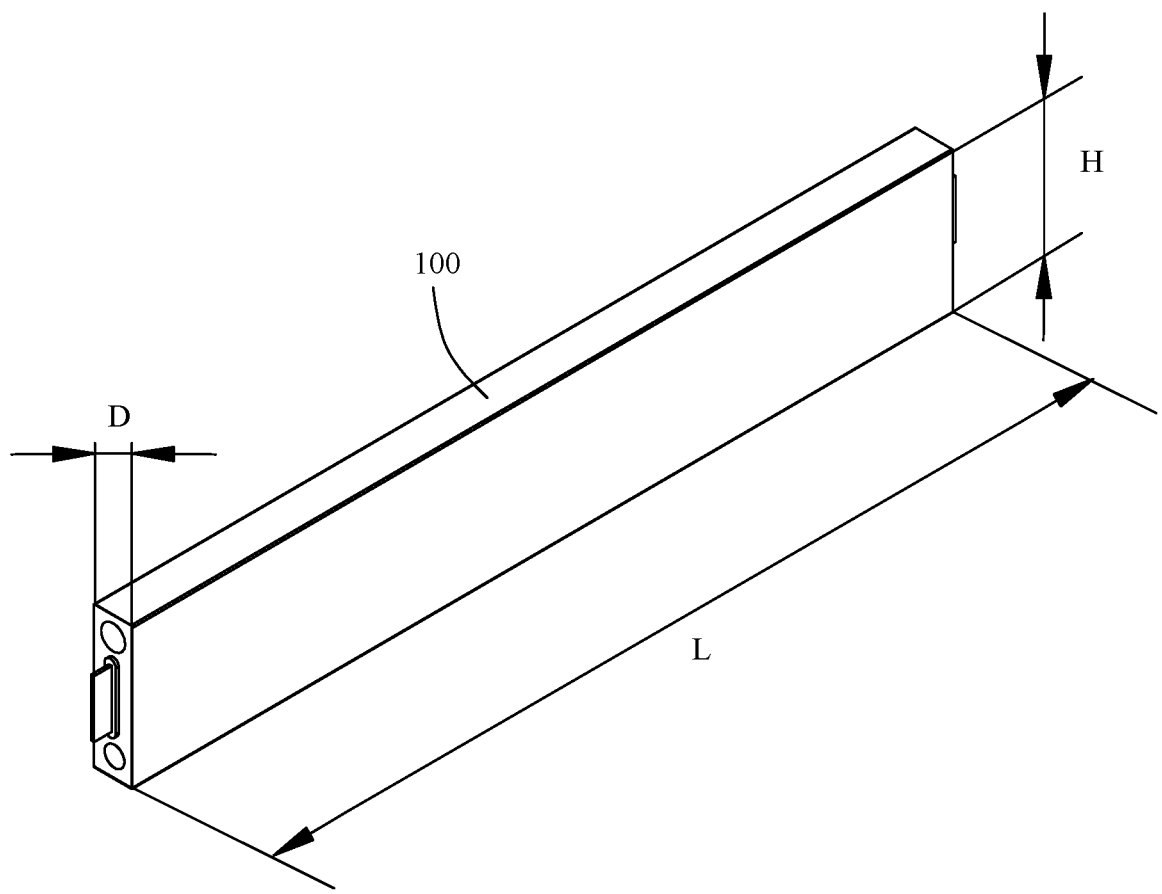
FIG. 1 is a schematic structural diagram of a battery according to an embodiment of this application.

100. Battery;
101. Case;
102. Receiving cavity;
103. Battery core group; 1031. Battery core; 1032. First electrode lead-out member; 1033. Second electrode lead-out member;
104. Separation membrane bag;
105. Separator plate; 1051. Connection through hole; 1052. Sealing structure;
106. Liquid injection channel; 1061. Liquid inlet; 1062. Liquid outlet; 1063. First channel; 1064. Second channel; 1065. Outer segment; 1066. Closed region; 1067. Inner segment; 1068. First through hole; 1069. Second through hole;
107. Sealing portion; 1071. First segment; 1072. Second segment; 1073. Third segment;
108. Battery core connector; 1081. Copper connecting portion; 1082. Aluminum connecting portion;
200. Battery pack.

DETAILED DESCRIPTION

The following describes embodiments of this application in detail. Examples of the embodiments are shown in the accompanying drawings. The same or similar elements and the elements having same or similar functions are denoted by like reference numerals throughout the descriptions. The embodiments described below with reference to the accompanying drawings are exemplary and merely intended to explain this application, but cannot be understood as a limitation on this application.

In the description of this application, it should be noted that relative terms such as "central", "longitudinal", "lateral", "length", "width", "thickness", "upper", "lower", "front", "rear", "left", "right", "vertical", "horizontal", "top", "bottom", "inner", "outer", "axial direction", "radial direction", and "circumferential direction" should be construed to refer to the orientation or the position relationship as shown in the drawings. These relative terms are for convenience and simplification of description of this application and do not indicate or imply that a specified apparatus or element needs to have a specified orientation and be constructed or operated in a particular orientation. Therefore, it should not be understood as a limitation on this application.

In the prior art, for example, in Patent CN201110021300.4 provides an internal series battery group, including a battery case and a plurality of battery core groups disposed in one battery case, the plurality of battery core groups are connected in series, and two adjacent battery core groups are separated by a separator plate. The battery of the structure has direct connection of two adjacent battery core groups directly in the case, which reduces the use of the external power connector, and not only increases the space utilization rate of the battery pack as a whole, but also reduces the Internal friction and heat caused by the use of external power connectors.

In this patent, because a plurality of battery core groups are connected in series side by side, the battery has a relatively high potential difference. Therefore, if the plurality of battery core groups in series share an electrolyte in a cavity, the electrolyte is likely to be decomposed due to a high potential difference, leading to a failure of the battery. Therefore, to resolve the problem, in this patent, a separator plate is disposed between two adjacent battery core groups. The separator plate separates the battery core groups in respective cavities, and there is an independent electrolyte in each cavity.

However, in CN201110021300.4, because separator plates divide the interior of the case into a plurality of independent cavities, how to inject an electrolyte into each independent cavity and how to implement a sealing of the liquid injection while ensuring that two adjacent cavities are isolated become problems that are not considered in CN201110021300.4, and also become key problems of the solution disclosed by CN201110021300.4.

Figure 2:
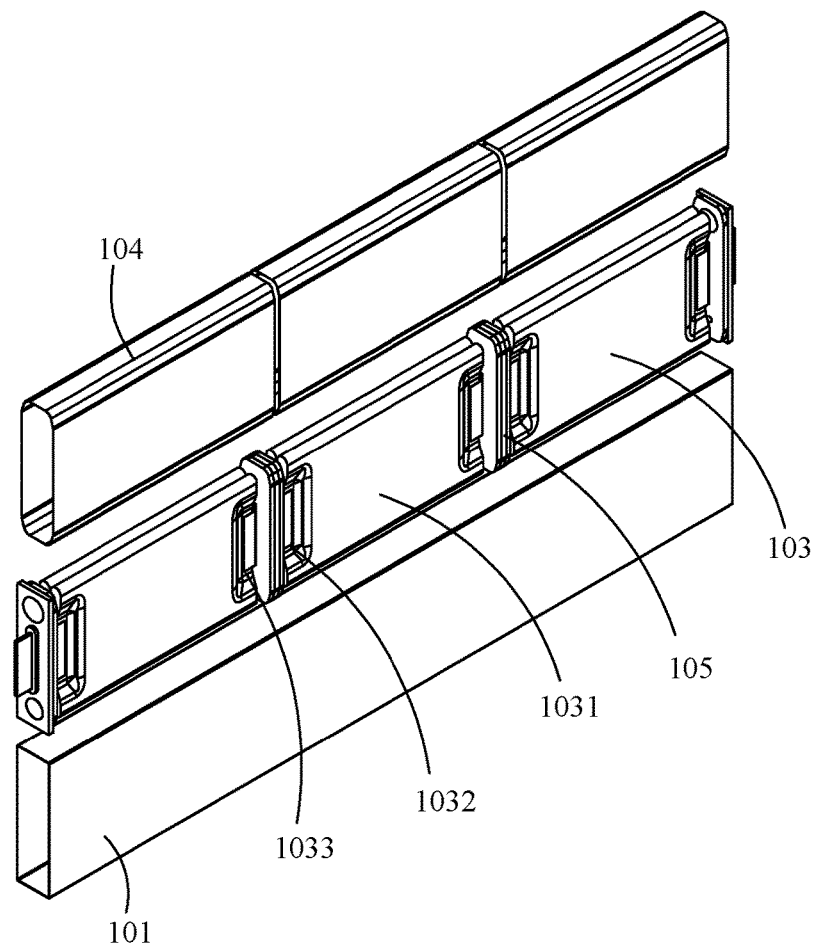
FIG. 2 is an exploded view of a battery according to an embodiment of this application.
Figure 3:
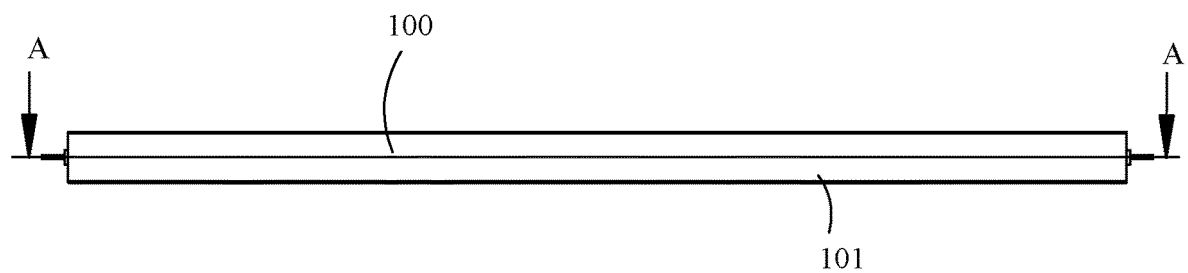
FIG. 3 is a front view of a battery according to an embodiment of this application.

As shown in FIG. 1 and FIG. 2, this application provides a battery 100, including a case 101 and a battery core assembly disposed in the case 101. The battery core assembly includes a plurality of battery core groups 103 and a receiving space used for holding the plurality of battery core groups 103. The battery core groups 103 are connected in series, and the battery core groups 103 each include at least one battery core 1031. A separator plate 105 is disposed between at least two adjacent battery core groups 103. The separator plate 105 divides the receiving space into a plurality of receiving cavities 102. Each of the receiving cavities 102 holds one or more battery core groups 103, in some embodiments, each of the receiving cavities 102 holds a single battery core group 103, and a cavity wall of the receiving cavity 102 comprised by a connection of the separator plate 105 and the separation membrane (for example, the separation membrane bag 104 in the following description) connected to the separator plate 105. The battery further includes a liquid injection channel that is in a sealed state, and the liquid injection channel is disposed on at least one of the separation membranes and the separator plates.

The battery core 1031 and the battery core group 103 are components of the interior of a casing of the battery 100, and cannot be understood as the battery 100 itself. It may be a battery core 1031 formed by means of winding, or may be a battery core 1031 formed by means of stacking. In general, the battery core 1031 at least includes a positive electrode plate, a membrane, a negative electrode plate, and an electrolyte. The battery core 1031 generally refers to an assembly that is not completely sealed. Therefore, the battery mentioned in this application is the battery 100, and cannot be simply understood as a battery module or a battery group due to that the battery includes a plurality of battery cores 1031. In this application, the battery core group 103 may be formed by a single battery core 1031, or may include at least two battery cores 1031, where the at least two battery cores 1031 are connected in parallel to form the battery core group 103. For example, the two battery cores 1031 are connected in parallel to form the battery core group 103; or four battery cores 1031 are connected in parallel to form the battery core group 103. In this application, the separation membrane may be attached to the surface of the battery core group 103, or may be disposed along the circumferential direction of the battery core group 103 at intervals. When the separation membranes are disposed along the circumferential direction of the battery core group 103 at intervals. In some embodiments of the present disclosure, the separator plate 105 props open the separation membrane, and a gap is arranged between the outer surface of the battery core group 103 and the separation membrane. That is, the separation membrane and the separator plate 105 are connected to form a sealed receiving cavity 102 to holding the battery core group 103.

In some embodiments of the present disclosure, the plurality of battery core groups 103 is connected in series.

For the plurality of battery core groups 103 are connected in series, as different battery core groups 103 has different voltages, it may cause low potential on one part of the casing, and it may easily cause lithium ions to be embedded inside the casing to form lithium-aluminum alloy, then resulting in corrosion of the aluminum casing. In the present disclosure, a separation membrane is disposed between the case 101 and the battery core group 103 to isolate the electrolyte from the case 101. The separation membrane has specific insulation and corrosion resistance to an electrolyte, and a material of the separation membrane is not specifically limited as long as it is insulating and does not react with the electrolyte. In some embodiments, the material of the separation membrane may include polypropylene (PP), polyethylene (PE), or a multilayer composite membrane. For example, in some embodiments, the multilayer composite membrane includes an inner layer, an outer layer, and a middle layer located between the outer layer and the inner layer. The inner layer includes a plastic material, for example, the inner layer may be made of an insulation material that has relatively less reaction with the electrolyte in the separation membrane, in some embodiments, an insulation material may be selected from PP or PE. The middle layer may include a metal material. It can prevent the permeability of moisture from the outside of the battery and can prevent the leakage of the internal electrolyte. In some embodiments, the middle layer may be selected from at least one of aluminum foil, stainless steel foil, copper foil. In some embodiments, a metal of the aluminum foil may be selected from a pure aluminum matrix material or an aluminum iron matrix alloy material. The outer layer is a protective layer generally made of a material such as a polyester material or a nylon material with a high melting point, which has a relative strong mechanical performance and can prevent an external force from damaging the battery. In some embodiments, the inner layer is a multilayer composite membrane. And in some embodiments, the inner layer is an aluminum-plastic composite membrane.

In some embodiments, the separation membrane has certain flexibility to facilitate the molding and manufacturing of the battery 100 and prevent piercing. In some embodiments, the thickness of the separation membrane is 80 um to 200 um, and certainly, the thickness can be adjusted according to an actual situation.

As plurality of battery core groups 103 are connected in series, there is an internal short-circuited problem if the electrolytes in different battery core groups 103 are connected. Moreover, because there is a relatively high potential difference (using a lithium iron phosphate battery as an example, the potential difference is approximately 4.0 volts to 7.6 volts) between different battery core groups 103, the electrolyte located in the battery core group is highly likely to be decomposed due to the potential difference, thereby affecting the performance of the battery. Therefore, a separator plate 105 is disposed between adjacent battery core groups 103. In some embodiments, in order to achieve a better insulation and isolation function, the separator plate 105 may be made by an insulation material. That is, the separator plate 105 is an insulation separator plate 105. Therefore, two adjacent battery core groups 103 are isolated by the separator plate 105.

In this application, the separator plates 105 divide the receiving space into a plurality of receiving cavities 102, and each receiving cavity 102 holds the battery core group, in some embodiments, each receiving cavity 102 holds one or more battery core groups. That is, two adjacent receiving cavities 102 share one separator plate 105. Therefore, the battery 100 described in this application is different from the battery module in the prior art.

In order to inject the electrolyte into the receiving cavity 102, the battery 100 further includes a liquid injection channel 106, the liquid injection channel 106 may be disposed on the separation membrane so that the liquid injection channel 106 is in a one-to-one correspondence with the separation membrane, or the liquid injection channel 106 may be disposed on the separator plate 105. The quantity of the liquid injection channels 106 may be one or more.

In this application, the liquid injection channel 106 of the battery is disposed on at least one of the separation membranes and separator plates 105 rather than being disposed on the case 101 of the battery. In other words, no liquid injection channel is disposed on the case 101 of the battery. Before the battery core assembly is located in the case 101, the electrolyte is directly injected into the at least one receiving cavity 102 through the liquid injection channel on the receiving cavity. That is, liquid injection of the battery 100 is completed first, and then the case 101 is sealed.

In the prior art, the liquid injection hole is generally disposed on the case 101, and when the quantity of the liquid injection holes increases, the manufacturing difficulty of the case 101 is increased, and moreover, the sealing performance of the liquid injection hole also faces great challenge. Once the electrolyte leaks, problems such as short-circuit may be caused. In this application, the liquid injection channel 106 is disposed on the separation membrane or the separator plate 105, and then the casing is sleeved outside the separation membrane and the separator plate 105. That is, the liquid injection hole is provided inside the case. The case 101 achieves a secondary sealing effect for the liquid injection channel 106, and the sealing performance of the entire battery is significantly improved. Once the electrolyte in one of the receiving cavities leaks, other receiving cavities are still maintained intact. Therefore, no safety problem may be caused due to the leakage of the electrolyte. In addition, when the liquid injection channel is opened on at least one of the separator plates and separation membranes, rather than on the case, the sealing of the liquid injection channel may be relatively easy. For example, the liquid injection hole is provided on the separation membrane, and when the separation membrane is plastic, the sealing requirement of the liquid injection hole can be satisfied when hot melting is used for sealing. In some embodiments, the separation membrane includes a separation membrane body and a protrusion portion that protrudes outward from the separation membrane body. In this case, an opening may be provided on the protrusion portion as a liquid injection channel, and after the liquid injection is completed, the protrusion portion with an opening is sealed and fastened by means of hot melting.

In this application, after the liquid injection of the receiving cavity 102 is completed, the liquid injection channel on at least one of the separator plate 105 and the separation membrane on the wall of the receiving cavity are in a sealing state. On the one hand, this can prevent the electrolyte in the receiving cavity from flowing out from the receiving cavity and touching the case to cause an internal short-circuit; on the other hand, the electrolyte may not flow between adjacent battery core receiving cavities to affect each other, and may not be decomposed due to a large potential difference, thereby ensuring the safety and service life of the battery.

In some embodiments of this application, the case includes a case body with openings at two ends and a cover plate, the cover plate is connected to the case body in a sealed manner to define a receiving space, and the battery core assembly is located in the receiving space. In some embodiments, the receiving cavity 102 which is close to a side of the cover plate and in which the battery core group 103 is located may be defined by the cover plate, the separation membrane, and the separator plate jointly. In this case, the liquid injection channel 106 of the receiving cavity 102 close to a side of the cover plate may be disposed on the cover plate, or may be disposed on the separation membrane or the separator plate 105.

In other words, the battery case may include two types of receiving cavities 102. A first receiving cavity is comprised by a connection of the separation membrane and the separator plate 105. A second receiving cavity is comprised by a connection of the cover plate, the separator plate 105, and the separation membrane connected between the cover plate and the separator plate 105. The liquid injection channel of the first receiving cavity is disposed on at least one of the separation membranes and separator plates, and the liquid injection channel of the second receiving cavity is disposed on the cover plate, or may be disposed on the separation membrane or the separator plate 105. It this embodiments, although the liquid injection channel is opened on the cover plate (a part of the case), compared with the prior art in which all the liquid injection channels are opened on the case, the sealing performance of the battery in this embodiments is still improved. Therefore, it is also in the protection scope of this application.

It should be noted that, after the electrolyte is injected into the receiving cavity 102, the liquid injection hole needs to be sealed. In one embodiments of this application, a sealing portion 107 is disposed on the liquid injection channel 106. The sealing portion 107 is at least partially located in the liquid injection channel 106, and seals the liquid injection channel 106, to prevent the liquid injection channel 106 from connecting the two adjacent battery core receiving cavities 102. That is, after the liquid injection is completed, the sealing portion 107 seals the liquid injection channel 106, to isolate the two adjacent battery core receiving cavities 102. In this case, the electrolyte may not flow between the adjacent battery core receiving cavities 102 and may not affect each other, and the electrolyte may not be decomposed due to a large potential difference, thereby ensuring the safety and service life of the battery.

For the sealing manner of the liquid injection channel 106, in an embodiments, when the liquid injection channel is disposed on the separation membrane, the separation membrane may be pressed together through hot melting to implement sealing. In this embodiments, sealing is relatively easy. When the liquid injection channel is disposed on the separator plate, the liquid injection channel 106 may be sealed with pressing by steel balls, or may be sealed by using seal nails. For a specific structure for sealing, refer to the detailed descriptions below.

In this application, each receiving cavity 102 may hold a single battery core group 103, or may hold a plurality of battery core groups, for example, two or three battery core groups. In some embodiments, the battery core assembly includes a plurality of battery core groups 103, the separator plate 105 is disposed between two adjacent battery core groups 103, and each of the receiving cavities 102 holds a single battery core group 103.

Figure 4:
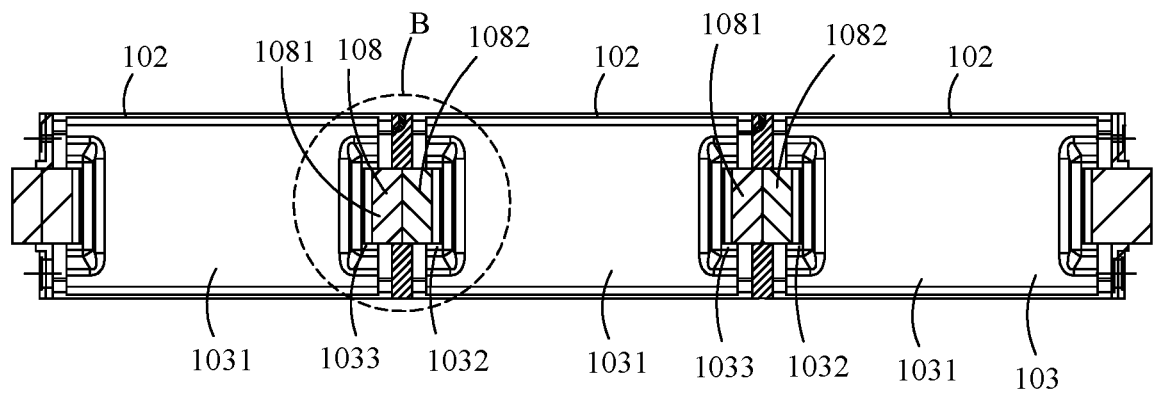
FIG. 4 is a cross-sectional view along an A-A direction in FIG. 3.
Figure 5:
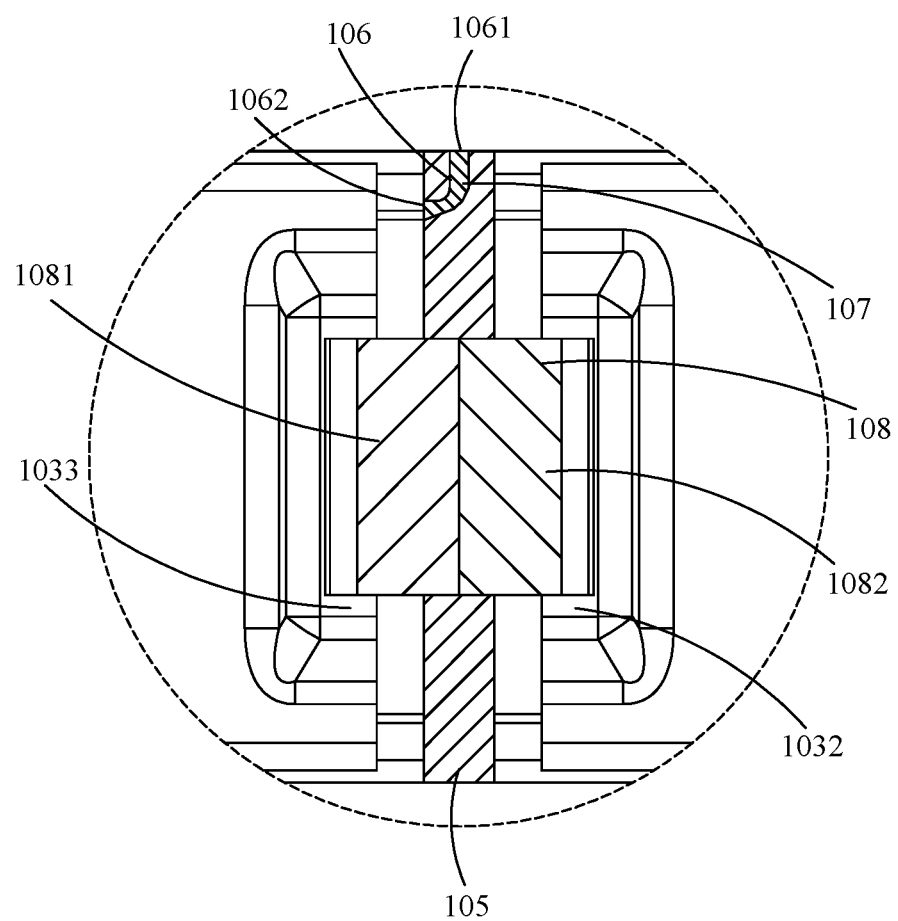
FIG. 5 is a partially enlarged view at B in FIG. 4.
Figure 6:
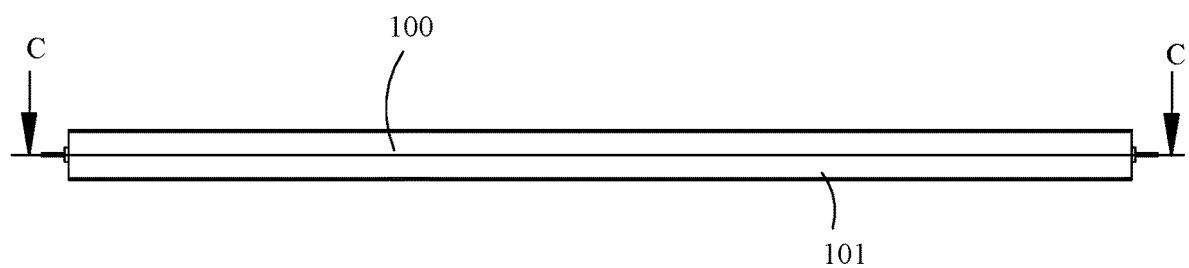
FIG. 6 is a front view of a battery according to another embodiment of this application.
Figure 7:
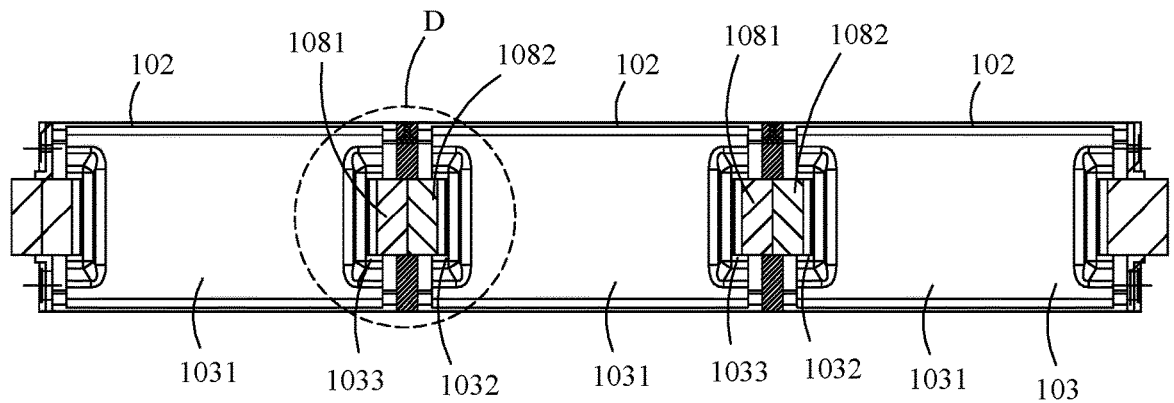
FIG. 7 is a cross-sectional view along a C-C direction in FIG. 6.

The battery core assembly includes a plurality of receiving cavities 102 and the battery core group 103 located in each receiving cavity 102. Generally, as shown in FIG. 2, FIG. 4, and FIG. 7, one receiving cavity 102 holds one battery core group 103. At least two battery core groups 103 are connected in series. Generally, the quantity of battery core groups 103 in series is determined according to an output voltage of each battery core group 103, a width of a battery pack 200, and an overall voltage of the battery pack 200. For example, a vehicle model requires that a voltage output by a battery system is 300 volt and a voltage of a conventional lithium-iron battery is 3.2 volt. Therefore, in the prior art, 100 batteries 100 need to be connected in series in the pack to meet the requirement. In the battery pack 200 according to this application, it is assumed that two battery core groups 103 are connected in series in one battery, and only 50 batteries need to be arranged to meet the requirement. Similarly, if ten battery core groups 103 are connected in series, only ten batteries need to be connected in series to meet the requirement. The design of the entire pack and the arrangement of the batteries are greatly reduced, so that the space can be effectively used, and space utilization can be improved.

To avoid the mutual circulation of the electrolytes in the receiving cavities 102 on two sides of the separator plates 105, the separator plate 105 is connected to the separation membrane in a sealed manner. The receiving cavity is a sealed receiving cavity, and a specific structure for sealing is not specifically limited. For example, when the separator plate 105 is a plastic separator plate 105, the separation membrane is made of plastics and can be connected in a sealed manner through hot melting.

In this application, the separation membrane surrounding the surface of each battery core group 103 may be integrated, or may be separated.

When the separation membrane is disposed separately, one battery core group 103 may correspond to one separation membrane, or a plurality of battery core groups 103 may correspond to one separation membrane. In other words, one separation membrane is sleeved on the surface of each battery core group, or the battery core groups are classified into a plurality of sets, and one separation membrane is sleeved on the surface of each set of battery core groups. A specific form of the separation membrane is not limited. In some embodiments, one separation membrane is independently sleeved on the surface of each battery core group. The shape of the separation membrane is tubular with openings at two ends, the battery core group 103 is located in the tubular separation membrane, and the separator plates 105 are connected to the openings at two ends in a sealed manner.

When the separation membrane is integrally disposed, that is, one separation membrane is sleeved on the plurality of battery core groups. In one of the embodiments, the separation membrane is bag-shaped. In some embodiments, the battery core assembly includes a separation membrane bag 104, a plurality of battery core groups 103 located in the separation membrane bag 104, and separator plates 105 located between adjacent battery core groups 103. The plurality of separator plates 105 is connected to the separation membrane 104 in a sealed manner to divide the separation membrane bag 104 into the plurality of receiving cavities 102. The plurality of battery core groups 103 is respectively located in the plurality of receiving cavities 102. Therefore, insulation partition is implemented between adjacent battery core groups 103 by using the separator plate 105. When the separation membrane is integrally disposed, the manufacturing technique of the separation membrane may be easy and has strong operability.

In this application, to facilitate the opening and sealing of the liquid injection channel, the liquid injection channel 106 is opened on the separator plate 105, and the liquid injection channel 106 is configured to inject the electrolyte into the receiving cavity 102.

The separator plate 105 is located between two adjacent battery core groups 103, and the liquid injection channel 106 is configured to inject the electrolyte into at least one of the two adjacent battery core groups 103 on two sides of the separator plate 105.

It should be noted that when the electrolyte is simultaneously injected into the battery core groups on two sides of the separator plate through the liquid injection channel on one separator plate 105, it is unnecessary to dispose a liquid injection channel on each separator plate 105, and liquid injection channels may be disposed on the separator plates at intervals of one separator plate 105.

For an array formed by a plurality of battery core groups, separator plates located at the head and tail of the array are each provided with only one liquid injection channel to inject the electrolyte into the battery core groups on one side.

In the power battery field, the consistency of a working condition of each battery 100 is of vital importance, and directly affects the performance of the entire battery pack 200. Similarly, in this application, the consistency of the working condition of each battery core group 103 in the battery may affect the entire performance of each battery, and further affects the performance of the entire battery pack 200. Inside a battery, the amount of the electrolyte may affect the performance of the battery, for example, capacity or activity.

Because the existence of the separator plates 105, if the liquid injection hole is only disposed on the case 101 on one end or two ends in a first direction, and a liquid diversion through hole is provided on the separator plates 105 to inject the electrolyte into the middle battery core receiving cavity 102, when the quantity of the separator plates 105 is greater than or equal to two and a length of the battery 100 along the first direction is relatively long, a soaking path of the electrolyte in each receiving cavity 102 is not consistent, thus failing to ensure the consistency of the electrolyte in each receiving cavity 102 and leading to the deterioration of the performance of the battery. Therefore, in this application, by providing a plurality of openings for liquid injection, the electrolyte can be directly injected into each battery core receiving cavity 102, thereby ensuring the consistency of the electrolyte.

By opening the liquid injection channel 106 on the separator plate 105, the molding process of the battery 100 can be optimized while ensuring that the soaking of the electrolyte is effective and in time.

One or more liquid injection channels 106 may be located on each separator plate 105. Each liquid injection channel 106 may be configured to inject liquid into one battery core receiving cavity 102 at a time, or injecting liquid into two adjacent battery core receiving cavities 102 located on two sides of the separator plate 105 simultaneously. The separator plate 105 may be plate-shaped, or may be cylinder-shaped, or may be in another shape. The liquid injection channel may be disposed on each separator plate 105, or the liquid injection channels may be disposed on the separator plate 105 at intervals of one separator plate.

In some embodiments, the separator plate 105 includes a circumferential surface and two side surfaces, the side surfaces of the separator plate 105 face the adjacent battery core groups 103 on two sides of the separator plate 105, and the circumferential surface of the separator plate 105 is opposite to an inner surface of the case 101.

The liquid injection channel 106 includes a liquid inlet 1061 and a liquid outlet 1062 connected with each other, the liquid inlet 1061 of the liquid injection channel 106 is located on the circumferential surface of the separator plate 105, and the liquid outlet 1062 of the liquid injection channel 106 is located on the side surface of the separator plate 105.

In this application, the liquid injection channel 106 may be flexibly disposed. For example, the liquid injection channel may be an arc-shaped or a curved cylindrical channel, or may be an L-shaped channel.

One liquid inlet 1061 is disposed on the circumferential surface of the separator plate 105, the liquid outlet 1062 is provided on one of the two side surfaces of the separator plate 105, and the liquid injection channel 106 is configured to inject the electrolyte into the battery core group 103 corresponding to the liquid outlet 1062. In this embodiments, one liquid injection channel 106 corresponds to one battery core receiving cavity 102, and in this way, the volume of the electrolyte injected into the battery core group 103 may be accurately controlled.

In this application, one liquid inlet 1061 is disposed on the circumferential surface of the separator plate 105, and the liquid outlet 1062 is disposed on each of the two side surfaces of the separator plate 105.

In some embodiments, because the distance between the battery core receiving cavities 102 located on two sides of the separator plate 105 is relatively short, the liquid injection channel 106 on the separator plate 105 can be used for injecting the electrolyte into the adjacent receiving cavities 102 on two sides of the separator plate 105 simultaneously. Even a soaking path of the electrolyte is relatively short, the electrolyte can still soak the battery core groups 103 on two sides in time and effectively. Under the premise of not affecting the consistency of the battery, the manufacturing technique of the separator plate 105 may be simplified.

Figure 10:
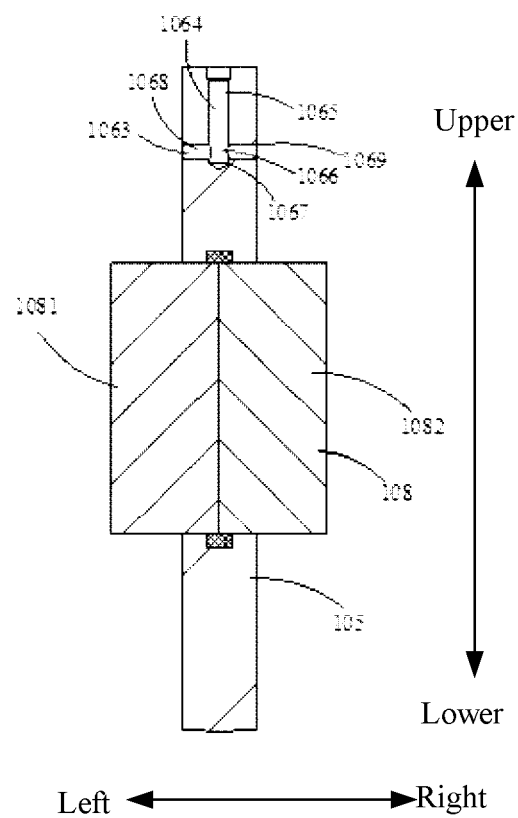
FIG. 10 is a schematic structural diagram of disposing a liquid injection channel on a separator plate according to another embodiment of this application.
Figure 11:
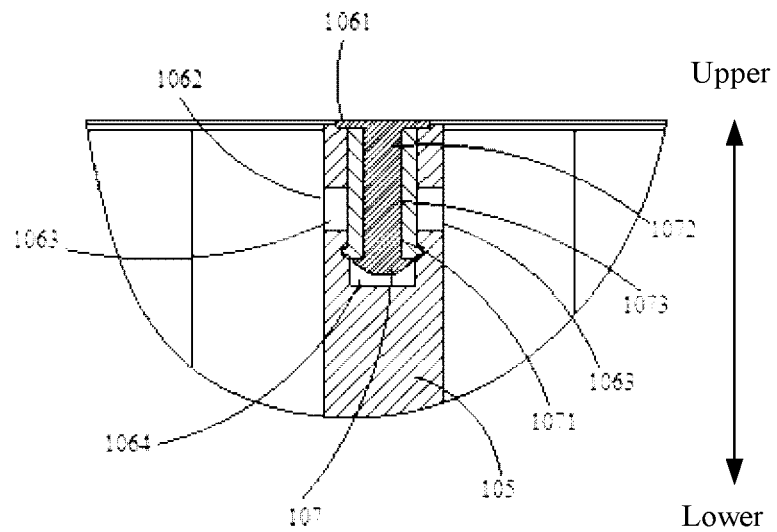
FIG. 11 is a partial schematic structural diagram of a sealing portion fitting a liquid injection channel in a sealed manner according to another embodiment of this application.
Figure 12:
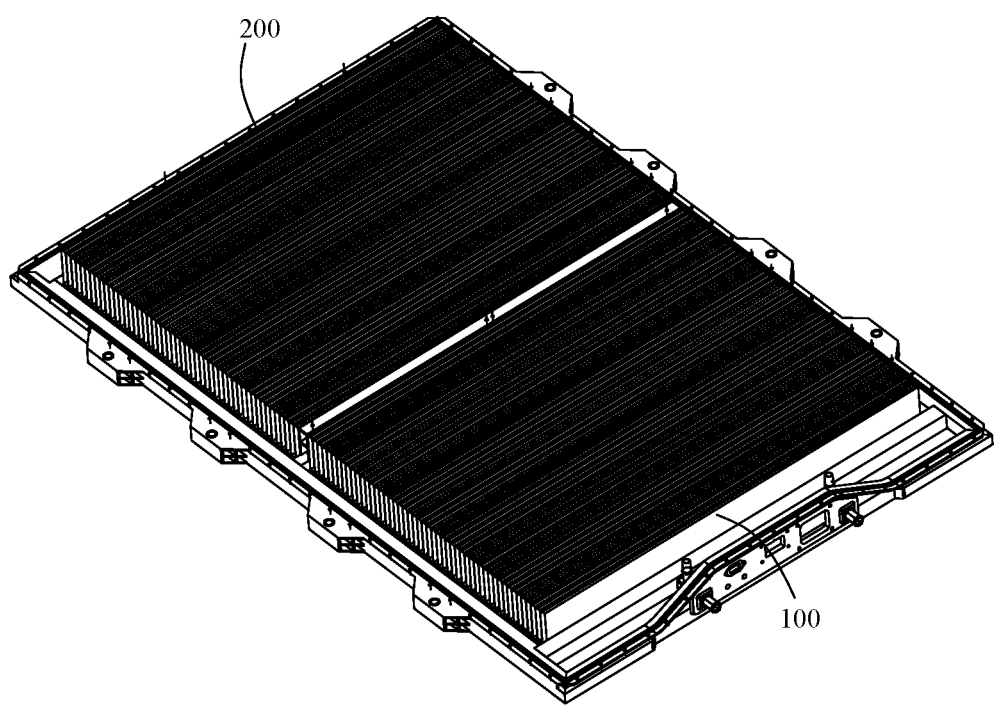
FIG. 12 is a schematic structural diagram of a battery pack according to an embodiment of this application.

In some embodiments of this application, as shown in FIG. 10 and FIG. 11, the liquid injection channel 106 includes a first channel 1063 and a second channel 1064. The first channel 1063 penetrates the separator plate 105 through the side surfaces of the separator plate 105. The second channel 1064 extends towards the first channel 1063 from the circumferential surface of the separator plate 105 and is connected to the first channel 1063. A sealing portion 107 is disposed in the second channel 1064. In this solution, as long as the sealing portion 107 is inserted into the second channel 1064, the sealing of the liquid injection channel 106 can be implemented. The separator plate 105 includes side surfaces facing the receiving cavity 102 of the battery core 1031 and a circumferential surface fitting the casing, an opening of the first channel 1063 is located on the side surface, and an opening of the second channel 1064 is located on the circumferential surface of the separator plate 105; the plugging member is mounted in the second channel 1064.

As shown in FIG. 10, the left and right surfaces of the separator plate 105 are facing the receiving cavity 102 of the battery core 1031, and the upper and lower end surfaces of the separator plate 105 are the circumferential surface. It may be understood that the separator plate 105 is a plate-shaped body, and the left and right surfaces are generally flat surfaces. The circumferential surface of the separator plate 105 opposite to the casing is an outer surface at the peripheral edges of the separator plate 105. For example, when the battery 100 is a rectangular battery 100 with a rectangular casing, the peripheral edges of the separator plate 105 become four sides of the rectangle. In this way, the circumferential surface of the separator plate 105 is surfaces that are formed by the four edges of the separator plate 105 and face the adjacent casing, for example, the upper and lower surfaces of the separator plate 105 in FIG. 10.

In this way, on the separator plate 105, the opening of the second channel 1064 opens in a direction toward the casing, and the plugging member may be inserted into the second channel 1064 at the opening and seals the first channel 1063.

In this application, to improve the volume utilization of the battery, a gap between the receiving cavity and the case generally is relatively small, and the battery core group may not drastically move inside the case. In some embodiments, when the length of the battery is relatively long, and to increase the stability of the battery, a position at which the battery core group touches the case is slightly pressed toward the casing, so that the case and the separator plate are tightly clamped.

In some embodiments, the second channel 1064 includes an outer segment 1065, a closed region 1066, and an inner segment 1067. The closed region 1066 is located between the outer segment 1065 and the inner segment 1067. As shown in FIG. 11, the sealing portion 107 sequentially includes a second segment 1072, a third segment 1073, and a first segment 1071 from top to bottom. During mounting, the sealing portion 107 sequentially passes through the outer segment 1065, the closed region 1066, and the inner segment 1067, and is fixed in the second channel 1064. In this embodiment, the first channel 1063 is connected through the closed region 1066. A part, which is located in the closed region 1066, of the sealing portion 107 mounted in the second channel 1064 seals the first channel 1063.

Correspondingly, as shown in FIG. 11, the sealing portion 107 includes a first segment 1071 located in the inner segment 1067, a second segment 1072 located in the outer segment 1065, and a third segment 1073 located in the closed region 1066, where the third segment 1073 seals the first channel 1063 to prevent the first channel 1063 from connecting the two adjacent receiving cavities 102 of the battery cores 1031. In this embodiment, as shown in FIG. 11, an upper end (the second segment 1072) of the sealing portion 107 is higher than the closed region 1066, a lower end (the first segment 1071) is lower than the closed region 1066, such that the sealing function of the sealing portion 107 for the first channel 1063 can be better ensured.

As shown in FIG. 10 and FIG. 11, in an embodiment of this application, the sealing portion 107 and the first channel 1063 are disposed in an intersecting manner. The first channel 1063 is split into a first through hole 1068 and a second through hole 1069 by the second channel 1064, and the first through hole 1068 and the second through hole 1069 are both connected to the closed region 1066 of the sealing portion 107. When the third segment 1073 of the sealing portion 107 seals the liquid diversion through hole, the third segment 1073 of the sealing portion 107 cuts off the connection between the first through hole 1068 and the second through hole 1069, to prevent the liquid diversion through hole from connecting the two adjacent receiving cavities 102.

In some embodiments, the outer segment 1065, the inner segment 1067, and the closed region 1066 are all cylinder-shaped grooves, and the first through hole 1068 and the second through hole 1069 are both cylinder-shaped holes. The sealing portion 107 and the second channel 1064 are disposed in an intersecting manner. The closed region 1066 of the second channel 1064 splits the liquid diversion through hole into the first through hole 1068 and the second through hole 1069. That is, the closed region 1066 is located between the first through hole 1068 and the second through hole 1069. The first through hole 1068 and the second through hole 1069 are both connected to the closed region 1066 so that the two adjacent receiving cavities 102 of the battery cores 1031 are connected to each other. In the embodiment of this application, an inner diameter of the closed region 1066 is greater than an inner diameter of the first through hole 1068, or the inner diameter of the closed region 1066 is greater than an inner diameter of the second through hole 1069, or the inner diameter of the closed region 1066 is greater than both the inner diameter of the first through hole 1068 and the inner diameter of the second through hole 1069. When the closed region 1066 holds the third segment 1073 of the plugging member by means of an interference fit, the third segment 1073 can at least seal one of the first through hole 1068 and the second through hole 1069, to disconnect the connection between the first through hole 1068 and the second through hole 1069, so as to prevent the liquid diversion through hole from connecting the two adjacent receiving cavities 102 of the battery cores 1031.

In some embodiments, the outer segment 1065, the inner segment 1067, and the closed region 1066 are disposed coaxially and have the same inner diameter. Correspondingly, the sealing portion 107 is a cylinder in which an outer diameter of the first segment 1071, an outer diameter of the second segment 1072, and an outer diameter of the third segment 1073 are the same. The sealing portion 107 is disposed in the second channel 1064 by means of an interference fit, to better cut off the connection between the first through hole 1068 and the second through hole 1069.

In some embodiments, the outer segment 1065, the inner segment 1067, and the closed region 1066 of the second channel 1064 are disposed coaxially. At the same time, the inner diameter of the outer segment 1065 is greater than the inner diameter of the closed region 1066, and the inner diameter of the closed region 1066 is greater than the inner diameter of the inner segment 1067. In this disposition manner, the second segment 1072, the third segment 1073, and the first segment 1071 of the sealing portion 107 form a stepped structure. The second segment 1072 is fitted in the outer segment 1065, the third segment 1073 is fitted in the closed region 1066, and the first segment 1071 is fitted in the inner segment 1067. The stepped structure with three segments better facilitates the insertion and mounting of the sealing portion 107.

To facilitate injection of the electrolyte and to better observe and control the height of the electrolyte, in an embodiment of this application, the first through hole 1068 and the second through hole 1069 are both cylindrical holes, and the first through hole 1068 and the second through hole 1069 are disposed coaxially. In this embodiment, it at least can be confirmed that liquid levels of the electrolyte in the plurality of receiving cavities 102 of the battery cores 1031 are the same when the liquid level of the electrolyte increases to a same height as the first through hole 1068 and the second through hole 1069 in the circumferential direction, thus ensuring the consistency of the volumes of the electrolyte injected, and further ensuring the consistency of the battery 100.

In some embodiments, the first through hole 1068 and the second through hole 1069 are both cylindrical holes, and the inner diameter of the first through hole 1068 and the inner diameter of the second through hole 1069 are the same. In this way, the liquid injection rate is ensured.

In some embodiments, the second segment 1072, the first segment 1071, and the third segment 1073 of the sealing portion 107 are all cylinders, and the outer diameter of the third segment 1073 is greater than the outer diameter of the first through hole 1068 and/or the outer diameter of the second through hole 1069. In this case, the sealing portion 107 may well prevent the connection between the first through hole 1068 and the second through hole 1069.

In some embodiments, the first segment 1071, the second segment 1072, and the third segment 1073 of the sealing portion 107 are disposed coaxially, and the outer diameters of the three segments are the same, to implement better fitting with the second channel 1064.

In some embodiments, to fit with the step structure of the second channel 1064, the first segment 1071, the second segment 1072, and the third segment 1073 of the sealing portion 107 are disposed coaxially, where the outer diameter of the second segment 1072 is greater than the outer diameter of the third segment 1073, and the outer diameter of the third segment 1073 is greater than the outer diameter of the first segment 1071.

In some embodiments of the present invention, the sealing portion 107 and the second channel 1064 are connected by means of an interference fit.

Figure 8:
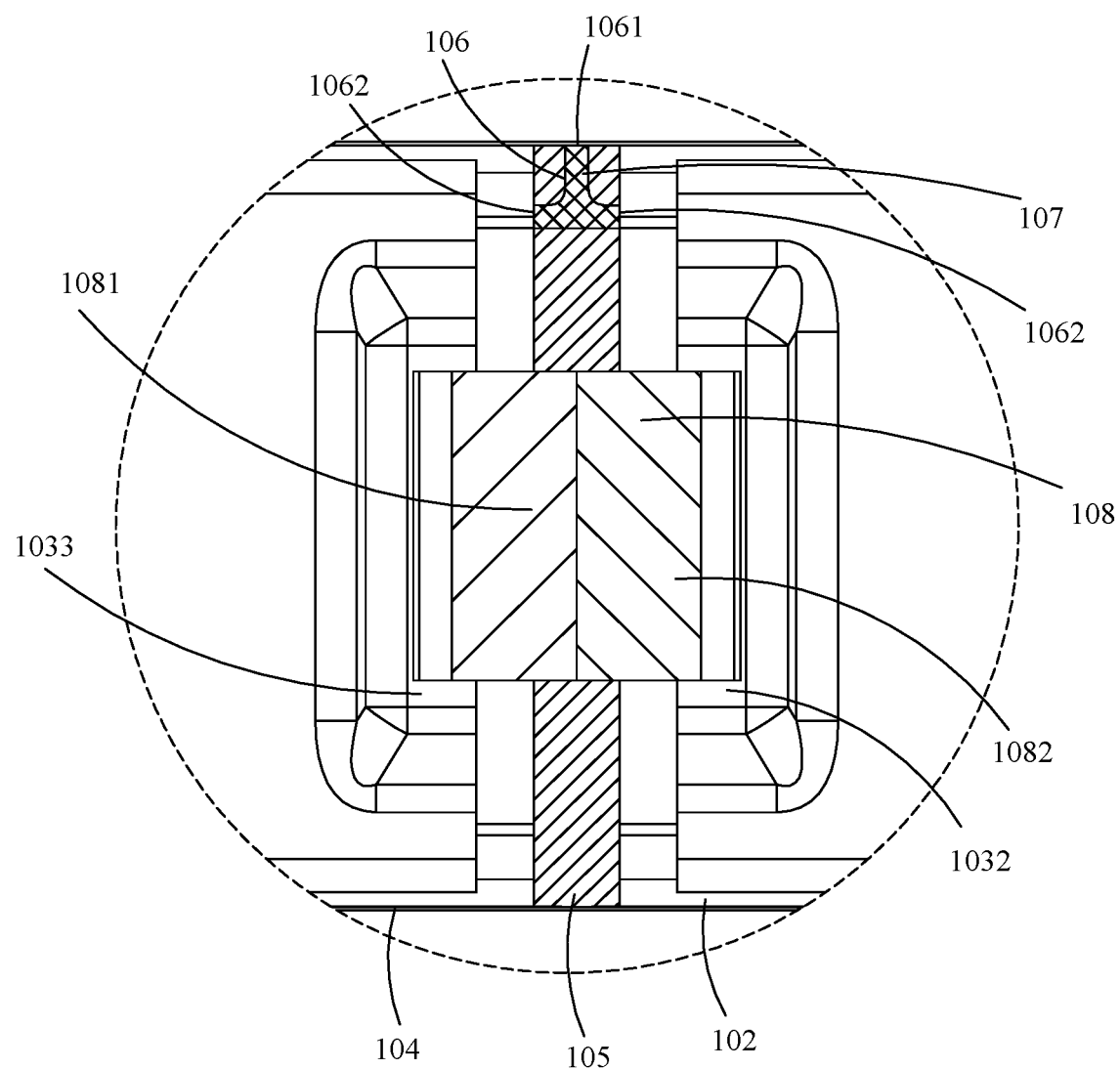
FIG. 8 is a partially enlarged view at D in FIG. 7.
Figure 9:
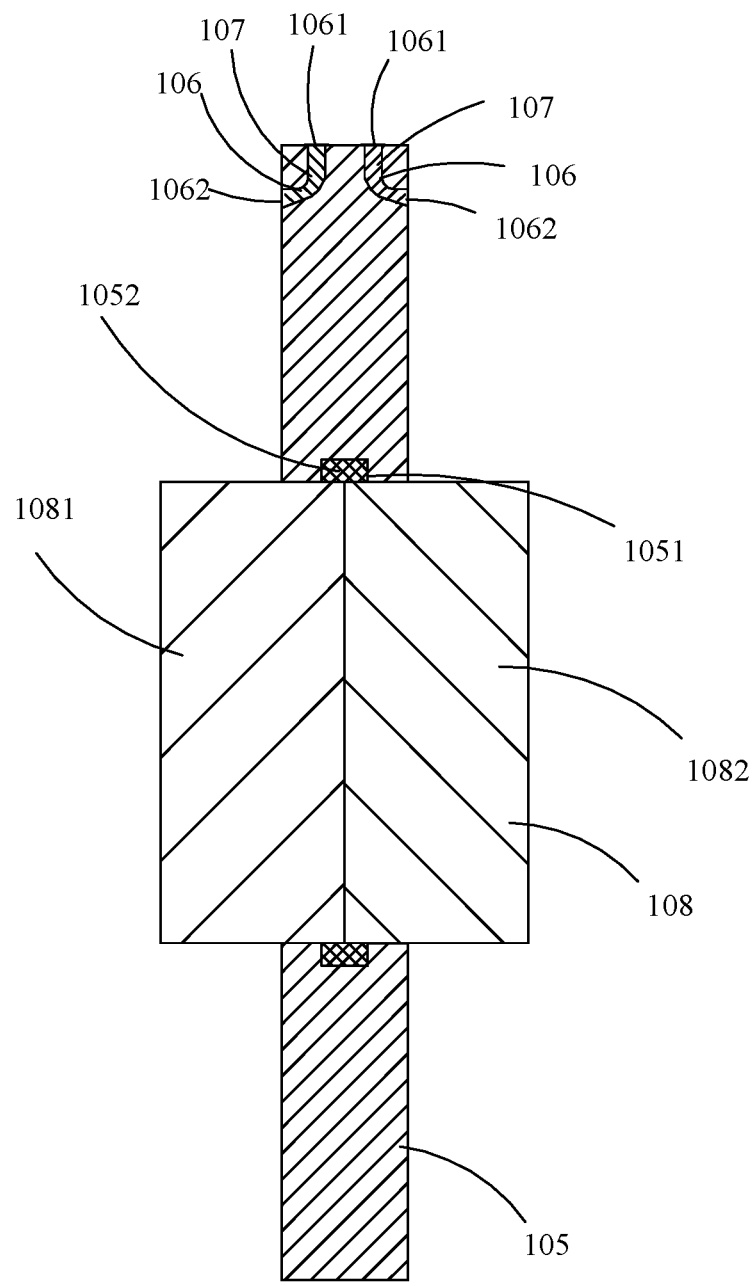
FIG. 9 is a schematic structural diagram of a separator plate connected to a battery core connector according to another embodiment of this application.

In some embodiments, as shown in FIG. 8 and FIG. 9, there may be one or more liquid outlets 1062 on each side surface. It should be noted that the quantity of liquid outlets 1062 on two side surfaces of the separator plate 105 may be different. For example, different quantities of liquid outlets 1062 may be provided on two separator plates 105 corresponding to the head end and tail end of the battery core assembly. The two separator plates 105 on the outermost sides of the battery core assembly are each provided with two liquid outlets 1062 on a side surface facing the outside of the battery core. The rest separator plates 105 are each provided with one liquid outlet 1062 on each side surface. In this way, the liquid injection rate is increased, and the volume of the electrolyte injected into each battery core 1031 may be ensured to be equal approximately.

A first liquid inlet 1061 and a second liquid inlet 1061 are disposed on the circumferential surface of the separator plate 105, where the first liquid inlet 1061 and the second liquid inlet 1061 may be flexibly arranged according to the shape of the separator plate 105. For example, when the separator plate 105 is a cube or a cuboid, the first liquid inlet 1061 may be located in different surfaces of the cube-shaped or cuboid-shaped separator plate 105, and the liquid outlet 1062 is disposed on each of the two side surfaces of the separator plate 105, where the liquid outlet 1062 on one of the two side surfaces of the separator plate 105 is denoted as a first liquid outlet 1062, and the liquid outlet 1062 on the other side surface is denoted as a second liquid outlet 1062. The first liquid inlet 1061 is connected with the first liquid outlet 1062, and the second liquid inlet 1061 is connected with the second liquid outlet 1062. One or more first liquid outlets 1062 and one or more second liquid outlets 1062 may be provided, and the quantity of first liquid outlets 1062 may be the same as or different from the quantity of second liquid outlets 1062.

The first liquid inlet 1061 and the first liquid outlet 1062 are connected with each other to form a first liquid injection channel 106. The second liquid inlet 1061 and the second liquid outlet 1062 are connected with each other to form a second liquid injection channel 106. The first liquid injection channel 106 and the second liquid injection channel 106 may be disposed in an intersecting manner, or may be disposed independently.

In this application, the battery core groups 103 are connected in series, to implement a high capacity and a high voltage of the battery 100, and to reduce the manufacturing processes and costs. That the battery core groups 103 are connected in series may be as follows: a plurality of battery core groups 103 is sequentially connected in series, or a plurality of battery core groups 103 is connected in series at intervals. For example, when there are four battery core groups 103, a first battery core group 103 and a third battery core group 103 may be connected in series to form a first string of battery core groups 103, a second battery core group 103 and a fourth battery core group 103 may be connected to form a second string of battery core groups 103, and then the two strings of battery core groups are connected in series.

In the prior art, for example, in Application No. CN201910544929.3, the size of the battery 100 is set to 400 mm to 2500 mm to improve the volume utilization of the battery pack 200. Due to a long battery, if only one battery core 1031 is disposed, the inner resistance of the battery is excessively high, the potential difference between the positive and negative ends is excessively large, and the electrolyte cannot work normally. By using the technical solution in this application, the battery 100 with a length ranging from 400 mm to 2500 mm may be manufactured in a relatively convenient manner, and the inner resistance and the connection between structural parts may be reduced as well, so that the costs are further reduced.

In this application, each of the battery core groups 103 includes a first electrode lead-out member 1032 and a second electrode lead-out member 1033 that are used for leading out a current, and at least one of the first electrode lead-out members 1032 and at least one of the second electrode lead-out members 1033 are disposed on two opposite sides of the battery core group 103 along a first direction; and all battery core groups 103 in the battery core assembly are arranged along the first direction.

In some embodiments, the first electrode lead-out member 1032 and the second electrode lead-out member 1033 are disposed on two opposite sides of the battery core group 103 along the first direction in the present invention. All battery core groups 103 in the battery core assembly are arranged along the first direction. The first direction is the length direction of the battery core assembly, and is also the length direction of the battery 100. That is, a "head to head" arrangement manner is used. This arrangement manner may implement that every two battery core groups 103 in the battery are connected in series conveniently, and the connection structure is simple. In addition, by using this arrangement manner, a relatively long battery 100 may be manufactured conveniently.

In this application, the battery 100 may be in various shapes. The shape may be a regular geometric shape, or may be an irregular geometric shape. For example, the battery 100 may be square, circular, polygonal or triangular, or may be in any other shape, for example, a special-shaped battery. It may be understood that the shape of the battery 100 is not limited in this application. In some embodiments, the battery 100 is cuboid in general. The battery 100 has a length L, a width H, and a thickness D, the length L is greater than the width H of the battery 100, and the width H is greater than the thickness D of the battery 100, where the length L of the battery 100 is 400 mm to 2500 mm.

It should be noted that, the battery being cuboid in general may be understood as follows: the battery 100 may be cuboid-shaped or square-shaped, or a part of the battery is in a special shape but the battery in general is cuboid-shaped or square-shaped, or the battery as a whole is approximately cuboid-shaped or square-shaped, with notches, bulges, chamfering, radians, or curves at parts of the battery.

In some embodiments, the thickness of the battery 100 has a large extension range, and batteries having a thickness greater than 10 mm may be freely compatible. The existing laminate polymer battery (less than 15 mm) implements an inner cavity by means of stretch-forming of the aluminum-plastic composite membrane. Therefore, the inner thickness of the battery is limited by the stretching performance of the aluminum-plastic composite membrane, and production of a battery with a large thickness cannot be implemented. Different from the existing laminate polymer battery, the battery in the present invention can implement the production of a battery having a thickness greater than 10 mm.

In this application, the length L and the width H of the battery 100 meet L/H=4~21.

The series connection manner in this embodiment may be that adjacent battery core groups 103 are connected in series. The specific embodiments may be that the current extraction parts in adjacent battery core groups 103 are directly connected, or an electrical connection may be implemented by using an additional conductive member. Generally, each of the battery core groups 103 includes a first electrode lead-out member 1032 and a second electrode lead-out member 1033 that are used for leading out a current. If the battery core group 103 only includes one battery core 1031, the first electrode lead-out member 1032 and the second electrode lead-out member 1033 may be a positive tab-lead and a negative tab-lead of the battery core respectively, or a negative tab-lead and a positive tab-lead of the battery core respectively. If the battery core group 103 includes a plurality of battery cores 1031, the first electrode lead-out member 1032 and the second electrode lead-out member 1033 may be electrode wires. The "first" and "second" of the first electrode lead-out member 1032 and the second electrode lead-out member 1033 are only used for distinguishing names, and are not used for limiting the quantity. For example, there may be one or more first electrode lead-out members 1032.

In this application, the first electrode lead-out member 1032 of one battery core group 103 of two adjacent battery core groups 103 is electrically connected to the second electrode lead-out member 1033 of the other battery core group 103, the connecting portion of the first electrode lead-out member 1032 and the second electrode lead-out member 1033 is located in the separator plate 105 that is located between the two battery core groups, where the connecting portion of the first electrode lead-out member 1032 and the second electrode lead-out member is the portion at which the first electrode lead-out member 1032 and the second electrode lead-out member are connected to each other. That is, the first electrode lead-out member 1032 and the second electrode lead-out member are directly electrically connected.

In this application, because the two adjacent battery core groups 103 are located inside the same case 101, a distance between the two battery core groups 103 is greatly reduced. Compared with that the two batteries 100 are connected by using the connection of the first electrode lead-out member 1032 and the second electrode lead-out member 1033, a subsequent assembly process of the battery pack 200 is simplified; in addition, the usage of the materials is reduced, and the weight is reduced. Moreover, the two battery core groups 103 are mounted in the same case 101, so that the requirements on stability and firmness of the connection between the battery core groups 103 are greatly reduced.

To facilitate the electrical connection between the first electrode lead-out member 1032 and the second electrode lead-out member 1033, a connection through hole 1051 is opened on the separator plate 105, the connecting portion of the first electrode lead-out member 1032 and the second electrode lead-out member 1033 is located in the connection through hole of the separator plate that is located between two battery core groups.

To prevent the mutual permeation of the electrolyte in the receiving cavities 102 on two sides of the separator plate 105, a sealing structure 1052 is disposed in the connection through hole 1051, so that the connecting portion and the separator plate 105 are connected in a sealed manner to cut off mutual movement of the electrolyte in the two adjacent battery core groups 103 on two sides of the separator plate 105.

In this application, the battery core groups 103 may be directly electrically connected, or may be indirectly connected. In one of the embodiments, the battery core assembly includes a battery core connector 108, and two adjacent battery core groups 103 are connected in series by using the battery core connector 108. One end of the battery core connector 108 is connected to a battery core on one side of the separator plate 105, and the other end of the battery core connector 108 is connected to a battery core group 103 on the other side of the separator plate 105.

Each of the battery core groups 103 includes the first electrode lead-out member 1032 and the second electrode lead-out member that are used for leading out a current, the first electrode lead-out member 1032 of one battery core group 103 of two adjacent battery core groups 103 is electrically connected to the second electrode lead-out member 1033 of the other battery core group 103 by using the battery core connector 108.

The two adjacent battery core groups 103 are connected by the battery core connector 108, which can provide a larger design space for the battery core connector 108, increase an over-current area, and reduce the inner resistance of the battery. The electrode lead-out member is directly welded to the battery core connector 108 in the separator plate 105. Compared with the series connection between the existing batteries, the welding procedure and steps are reduced, and a risk that may be caused by poor welding is reduced, thus improving the safety and reliability of the entire battery.

In some embodiments, a connection and a position relationship between the battery core connector 108 and the separator plate 105 are disclosed. As shown in FIG. 9, a connection through hole 1051 is opened on the separator plate 105. The battery core connector 108 penetrates the connection through hole 1051 and passes from one side of the connection through hole 1051 to the other side. That is, the battery core connector 108 passes through the connection through hole 1051, one end of the battery core connector 108 is connected to the battery core group 103 on one side of the separator plate, and the other end of the battery core connector 108 is connected to the battery core group 103 on the other side of the separator plate 105.

As described below, in some embodiments, the battery core connector 108 includes a copper connecting portion 1081 and an aluminum connecting portion 1082. Because copper and aluminum have a potential difference relative to lithium, corrosion may easily occur at positions where the copper connecting portion and the aluminum connecting portion touch the electrolyte. On the other hand, to isolate the battery core receiving cavities 102 on two sides of the separator plate 105, a sealing structure 1052 is disposed in the connection through hole 1051, the sealing structure 1052 seals the battery core connector 108 in the connection through hole 1051, and the sealing structure 1052 can also seal the connection through hole 1051, to isolate the adjacent battery core receiving cavities 102 on two sides of the separator plate 105.

The foregoing is a specific mounting solution of the battery core connector 108 according to one embodiment of this application. However, in this solution, secondary sealing needs to be performed on the connection through hole 1051, and the operation is very inconvenient. In addition, when during the secondary sealing, selection of the material used for the sealing structure 1052 is complex, and may affect the electrolyte inside the battery. In view of that, in another embodiment of this application, as shown in FIG. 9, a solution in which the battery core connector 108 and the separator plate 105 are integrally formed by means of injection molding is provided. In this solution, the battery core connector 108 and the separator plate 105 are integrally formed by means of injection molding. Specifically, the battery core connector 108 is manufactured first, and then the separator plate 105 is formed on the outside of the battery core connector 108 by means of injection molding. In the assembly process, the battery core group 103 and the battery core connector 108 are directly connected, and no through hole needs to be sealed, which simplifies the process and reduces risks.

In this application, the sealing structure 1052 is only required to have the sealing performance, be resistant to the corrosion of the electrolyte, and be insulating. For example, the sealing structure may be a rubber plug.

In some embodiments, as shown in FIG. 9, the battery core connector 108 includes a copper connecting portion 1081 and an aluminum connecting portion 1082, and a location of an electrical connection between the copper connecting portion 1081 and the aluminum connecting portion 1082 is inside the separator plate 105. In this embodiment, the copper connecting portion 1081 is connected to a copper lead-out end of the battery core group 103 on one side of the separator plate 105, and the aluminum connecting portion 1082 is connected to an aluminum lead-out end of the battery core group 103 on the other end of the separator plate 105.

In some embodiments, a compound connection is first performed on the copper connecting portion 1081 and the aluminum connecting portion 1082 to form a compound connecting portion; and then injection molding is performed on the outside of the compound connecting portion to form the separator plate 105. In this way, the contact position (compound connecting portion) between the copper connecting portion 1081 and the aluminum connecting portion 1082 is sealed inside the separator plate 105, to prevent exposure in the inner space of the battery, and especially prevent contact with the electrolyte, to avoid the corrosion of the connection position between the copper and aluminum.

After the plurality of battery cores 1031 are connected in series in the battery, because the case is integrally sealed, signals inside the battery may not be collected in real time if only signals from outside of the battery are collected. Therefore, the issue of signal collection of the battery needs to be considered in time. Therefore, in some embodiments of this application, the battery core assembly further includes a detection unit. By directly sealing the detection unit inside the case 101 of the battery, the state of the battery core groups inside the case 101 of the battery may be conveniently detected at any time, and the accuracy and promptness of sampling information can be ensured. It should be noted that the state of the battery core groups may be signals such as a temperature or a voltage.

In this application, the case 101 is configured to improve the strength of the battery, and ensuring the safe use of the battery, where the case may be a plastic case 101, or may be a metal case 101. When the case is a metal case 101, the heat dissipation performance is relatively good, and the strength of the case 101 is relatively high to play a role as a support.

In this application, the battery may be a lithium-ion battery.

In this application, other structures of the battery 100 are same as general configurations in the prior art, such as an explosion relief valve, a current interrupt device, and the like. Details are not described herein again.

According to another aspect of this application, a battery module including the battery 100 according to any one of the foregoing embodiments is provided. When the battery module provided in this application is used, few assembly processes are used, and the costs of the battery are relatively low.

As shown in FIG. 10, this application provides a battery pack 200, including the battery 100 according to any one of the foregoing embodiments or the battery module provided in the foregoing. When the battery pack 200 provided in this application is used, few assembly processes are used, the costs of the battery are relatively low, and the energy density of the battery pack 200 is relatively high.

An electric vehicle including the foregoing battery pack 200 is provided. When the electric vehicle provided in this application is used, the vehicle has a strong cruising capability and relatively low costs.

In this application, it should be noted that, unless otherwise specified and limited explicitly, terms such as "mount", "connect", and "connection" should be understood broadly, for example, it may be a fixed connection, a detachable connection, or an integral connection; a mechanical connection or an electrical connection; a direct connection, an indirect connection through an intermediation, or communication between interiors of two elements. A person of ordinary skill in the art may understand specific meanings of the terms in this application according to specific situations.

In this specification, descriptions of reference terms such as "embodiment", "specific embodiment", and "example" are intended to indicate that particular features, structures, materials, or characteristics described with reference to the embodiment or example are included in at least one embodiment or example of this application. In this specification, schematic descriptions of the foregoing terms do not necessarily refer to the same embodiment or example. Besides, the specific features, the structures, the materials or the characteristics that are described may be combined in a proper manner in any one or more embodiments or examples.

Although the embodiments of this application are shown and described above, a person of ordinary skill in the art can understand that changes, modifications, replacements, and variations can be made to the foregoing embodiments without departing from the principle and intention of this application, and the scope of this application is defined by the claims and equivalents thereof.

What is claimed is:

1. A battery, comprising a case and a battery core assembly disposed in the case, wherein
the battery core assembly comprises:
    a plurality of battery core groups and a receiving space holding the plurality of battery core groups, the battery core groups are connected in series, and the battery core groups each comprise at least one battery core;
    a separator plate is disposed between at least two adjacent battery core groups, the separator plate divides the receiving space into a plurality of receiving cavities, each of the receiving cavities holds one or more battery core groups;
    a cavity wall of the receiving cavity comprised by a connection of a separator plate and a separation membrane; and
    a liquid injection channel in a sealed state, wherein the liquid injection channel is disposed on at least one of the separation membranes and separator plates.

2. The battery according to claim 1, wherein before the battery core assembly is located in the case, at least one of the liquid injection channel is in an open state and the electrolyte is injected into at least one of the receiving cavities through the liquid injection channel on the receiving cavity.

3. The battery according to claim 1, wherein a sealing portion is disposed in the liquid injection channel, and the sealing portion seals the liquid injection channel.

4. The battery according to claim 1, wherein the battery core assembly comprises a plurality of battery core groups, the separator plate is disposed between two adjacent battery core groups, and each of the receiving cavities holds one battery core group.

5. The battery according to claim 1, wherein the separation membrane is located between the battery core groups and the case, and the separation membrane is connected to the separator plate in a sealed manner to form a sealed receiving cavity;
    wherein the sealed receiving cavity is defined by a tubular separation membrane with openings at two ends and separator plates sealed at the openings.

6. The battery according to claim 1, wherein the battery core assembly comprises a separation membrane bag, the separator plates and battery core groups located in the separation membrane bag, the separator plates are connected to the separation membrane bag in a sealed manner to divide the separation membrane bag into a plurality of receiving cavities; and each of the receiving cavities comprises a battery core group.

7. The battery according to claim 1, wherein the liquid injection channel is disposed on the separator plate, and the liquid injection channel is configured to inject the electrolyte into a receiving cavity.

8. The battery according to claim 7, wherein the separator plate is located between two adjacent battery core groups, and the liquid injection channel is configured to inject the electrolyte into at least one of the two battery core groups on two sides of the separator plate;
    wherein the separator plate further comprises side surfaces facing the receiving cavity and a circumferential surface facing the case; and
    the liquid injection channel further comprises a liquid inlet and a liquid outlet connected with each other, the liquid inlet of the liquid injection channel is disposed on the circumferential surface of the separator plate, and the liquid outlet of the liquid injection channel is disposed on the side surface of the separator plate.

9. The battery according to claim 8, wherein the separator plate comprises two side surfaces, the liquid inlet disposed on the circumferential surface of the separator plate, and the liquid outlet disposed on one of the two side surfaces of the separator plate, or
    the liquid outlet is disposed on each of the two side surfaces of the separator plate.

10. The battery according to claim 9, wherein the liquid injection channel comprises a first channel and a second channel, the first channel penetrates the separator plate through the side surfaces of the separator plate, the second channel extends towards the first channel from the circumferential surface of the separator plate and connected to the first channel, and a sealing portion is disposed in the second channel;

wherein the sealing portion is connected to the second channel by means of interference fit.

11. The battery according to claim 10, wherein the second channel comprises an outer segment, a closed region, and an inner segment, the closed region is located between the outer segment and the inner segment, and the first channel is connected to the second channel through the closed region; and the sealing portion comprises a first segment located in the inner segment, a second segment located in the outer segment, and a third segment located in the closed region, and the third segment seals the first channel to seal the liquid injection channel;

wherein the first channel and the second channel are disposed in an intersecting manner, the first channel is split into a first through hole and a second through hole by the second channel, and the first through hole and the second through hole are both connected to the closed region of the second channel.

12. The battery according to claim 8, wherein a first liquid inlet and a second liquid inlet are disposed on the circumferential surface of the separator plate, and the liquid outlet is disposed on each of the two side surfaces of the separator plate, the liquid outlet on one of the two side surfaces of the separator plate is denoted as a first liquid outlet, and the liquid outlet on the other side surface is denoted as a second liquid outlet; and the first liquid inlet is connected with the first liquid outlet, and the second liquid inlet is connected with the second liquid outlet.

13. The battery according to claim 1, wherein the separation membrane comprises a separation membrane body and a protrusion portion that protrudes outward from the separation membrane body, the liquid injection channel is an opening disposed on the protrusion portion, and the opening is sealed by means of hot melting.

14. The battery according to claim 1, wherein each of the battery core groups comprises a first electrode lead-out member and a second electrode lead-out member that are used for leading out a current, and the first electrode lead-out member and the second electrode lead-out member of at least one battery core group are disposed on two opposite sides of the battery core group along a first direction, and the first direction is an arrangement direction of the battery core group.

15. The battery according to claim 14, wherein the battery is cuboid in general, the battery has a length L, a width H, and a thickness D, the length L is greater than the width H of the battery, and the width H is greater than the thickness D of the battery, wherein the length L of the battery is 400 mm to 2500 mm;

wherein the thickness D of the battery is greater than 10 mm;

wherein the length L and the width H of the battery meets L/H=4~21;

wherein a length direction of the battery extends along the first direction, and a length direction of the battery core group extends along the first direction.

16. The battery according to claim 14, wherein the separator plate is provided with a connection through hole, a sealing structure is disposed in the connection through hole, the sealing structure is configured to package a connecting portion of the first electrode lead out member and the second electrode lead out member in the connection through hole, and the sealing structure seals the connection through hole to prevent mutual circulation of the electrolyte in the two adjacent battery core groups on two sides of the separator plate.

17. The battery according to claim 14, wherein the battery core assembly comprises a battery core connector, the first electrode lead-out member of one of the two adjacent battery core groups is electrically connected to the second electrode lead-out member of the other battery core group through the battery core connector;

wherein the separator plate is provided with a connection through hole, the battery core connector penetrates the connection through hole, a sealing structure is disposed in the connection through hole, the sealing structure is configured to package a battery core connector in the connection through hole, and the sealing structure seals the connection through hole to prevent mutual movement of the electrolyte in the two adjacent battery core groups on two sides of the separator plate;

wherein the battery core connector and the separator plate are integrally formed;

wherein the separator plate is an insulation separator plate.

18. The battery according to claim 17, wherein the battery core connector comprises a copper connecting portion and an aluminum connecting portion, and a location of an electrical connection between the copper connecting portion and the aluminum connecting portion is inside the separator plate.

19. A battery pack, comprising a battery according to claim 1.

20. An electric vehicle, comprising a battery pack according to claim 19.

* * * * *